US006167701B1

(12) United States Patent
Hatcher et al.

(10) Patent No.: US 6,167,701 B1

(45) Date of Patent: Jan. 2, 2001

(54) VARIABLE RATE RIDE CONTROL

(75) Inventors: Andrew Hatcher, Garner; Patrick Quinn, Raleigh, both of NC (US)

(73) Assignee: Caterpillar Inc., Peoria, IL (US)

( * ) Notice: Under 35 U.S.C. 154(b), the term of this patent shall be extended for 0 days.

(21) Appl. No.: 09/110,493

(22) Filed: Jul. 6, 1998

(51) Int. Cl.[7] ..................................................... F16D 31/02

(52) U.S. Cl. ................................................ 60/416; 60/469

(58) Field of Search .............................. 60/413, 416, 469

(56) References Cited

U.S. PATENT DOCUMENTS

| | | | | |
|---|---|---|---|---|
| 4,738,101 | | 4/1988 | Kubik | 60/413 |
| 4,969,562 | | 11/1990 | Saotome | 212/261 |
| 5,245,826 | | 9/1993 | Roth et al. | 60/413 |
| 5,333,533 | * | 8/1994 | Hosseini | 91/361 |
| 5,520,499 | | 5/1996 | Ufheil et al. | 414/685 |
| 5,706,657 | | 1/1998 | Amborski et al. | 60/413 |
| 5,906,089 | * | 5/1999 | Guinn et al. | 56/10.2 E |
| 5,992,146 | * | 11/1999 | Hausman | 60/413 |

* cited by examiner

*Primary Examiner*—Edward K. Look
*Assistant Examiner*—Thomas E. Lazo
(74) *Attorney, Agent, or Firm*—J. W. Burrows

(57) ABSTRACT

A variable rate ride control is disclosed and adapted to control the ride of a machine having varying load conditions. The variable rate ride control system includes an accumulator arrangement selectively connectable to an actuator arrangement of the machine. The accumulator arrangement has a variable pressure rate so that the accumulator arrangement can adapt to varying load conditions.

3 Claims, 2 Drawing Sheets

VARIABLE RATE RIDE CONTROL

TECHNICAL FIELD

This invention relates generally to a ride control system for a machine and more particularly to a variable rate ride control system.

BACKGROUND ART

In known ride control systems, the cushioning of the ride is controlled by an accumulator or accumulators connected in parallel. The known accumulator arrangements may have one or more accumulators depending on the size of the machine and the volume of fluid that is being moved in and out of the accumulator arrangement. As is well known in these arrangements, the pressure setting of each accumulator is substantially the same. Whether there is one or more accumulators in the accumulator arrangement, the pressure setting is fixed. Consequently, the control of the ride is limited to a certain limited range of operating pressures. If, for example, the ride control is being used on a wheel loader or a backhoe loader and the machine/bucket is empty, the ride control may function very well. However, if the bucket is full of material (load), the control system may not provide adequate cushioning because the extra load changed the cushioning characteristics of the accumulator system or caused the accumulator system to prematurely bottom out and become totally ineffective. If the operating pressure of the accumulator arrangement is increased to handle a loaded machine/bucket, the "ride" of the machine is more harsh when the machine/bucket is empty. It is desirable to have a ride control arrangement that is effective when the machine/bucket is empty or full or anywhere in-between.

The present invention is directed to overcoming one or more of the problems as set forth above.

DISCLOSURE OF THE INVENTION

In one aspect of the present invention, a variable rate ride control system is provided and adapted for use in a fluid system of a machine to cushion the ride of the machine. The machine has a frame with an actuator arrangement disposed between the frame and a load to raise the load relative to the frame of the machine. The actuator arrangement has a raise port and a lower port and is operative to raise and lower the load in response to pressurized fluid being selectively directed to and from the respective raise and lower ports thereof from a directional control valve that is connected to a source of pressurized fluid and a reservoir. The variable rate ride control system includes an accumulator arrangement having a variable pressure rate and a valve arrangement disposed between the accumulator arrangement, the actuator arrangement, and the reservoir. The accumulator arrangement is selectively connected to the actuator arrangement at a location downstream of the directional control valve and the valve arrangement is operative to selectively connect the accumulator arrangement to the actuator arrangement and the reservoir.

BEST MODE FOR CARRYING OUT THE INVENTION

Figure 1:
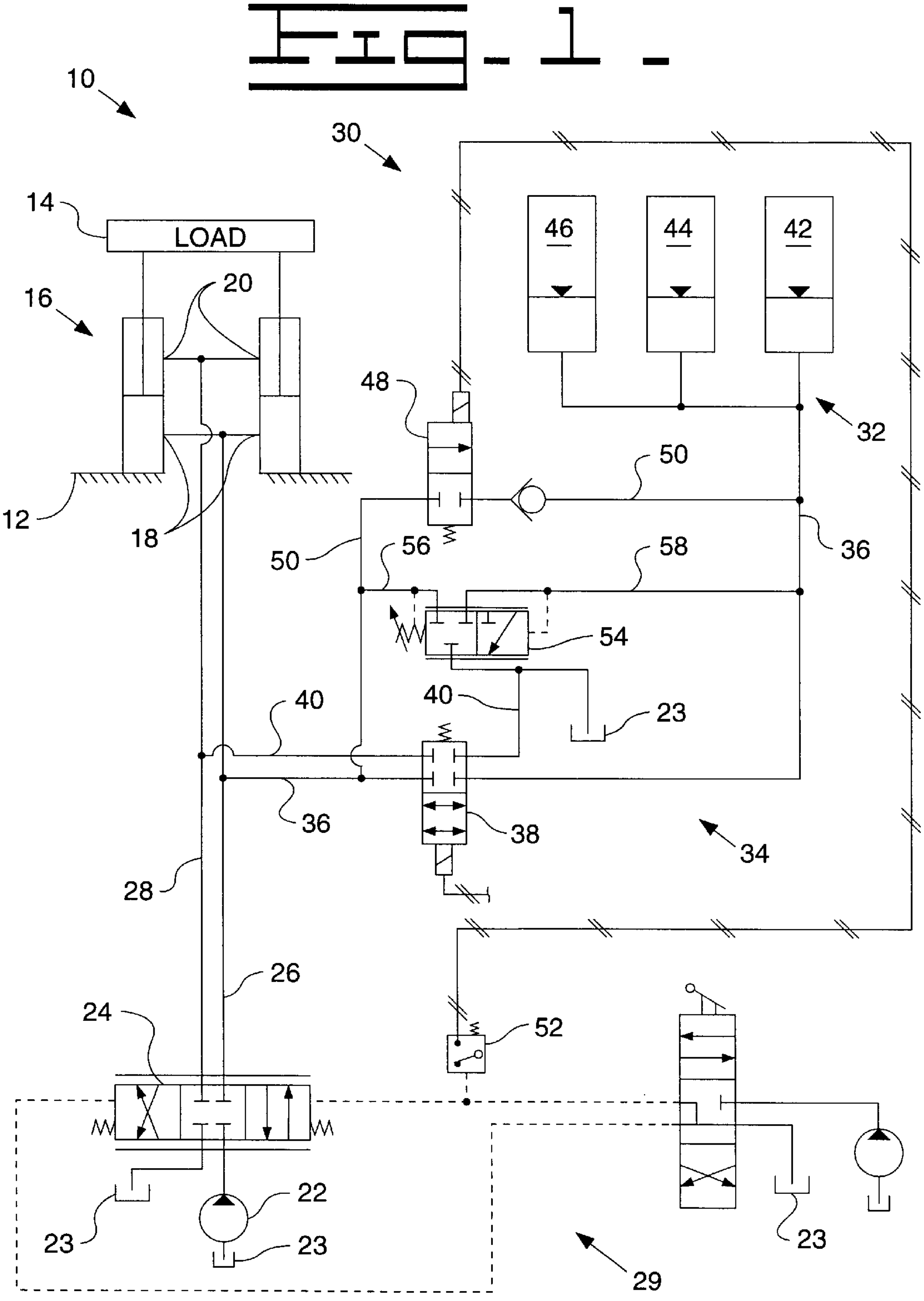
FIG. 1 is a schematic representation of a fluid system for a machine incorporating an embodiment of the subject invention.

Referring to FIG. 1 of the drawings, a fluid system 10 is illustrated and adapted for use in a machine (not shown) to control the riding comfort of the machine. A frame 12 and a load (bucket) 14 is diagrammatically illustrated in combination with the fluid system 10.

The fluid system 10 includes an actuator arrangement 16 disposed between the frame 12 and the load 14. The actuator arrangement 16 has a raise port 18 and a lower port 20. In the subject embodiment, two hydraulic cylinders are shown but it is recognized that only one or more than two cylinders could be used. A source of pressurized fluid, such as a pump 22, receives fluid from a reservoir 23 and provides pressurized fluid through a directional control valve 24 to the actuator arrangement 16 in a conventional manner to raise and lower the load. Conduits 26,28 directs the fluid flow between the directional control valve 24 and the raise and lower ports 18,20 of the actuator arrangement 16. In the subject embodiment, the movement of the directional control valve 24 is controlled by a pilot system 29.

A variable rate ride control system 30 is provided and includes an accumulator arrangement 32 having a variable pressure rate and a valve arrangement 34. The accumulator arrangement 32 is connected through the valve arrangement 34 to the reservoir 23 and to the actuator arrangement 16 downstream of the directional control valve 24. More specifically, a conduit 36 connects the accumulator arrangement 32 to the conduit 26 leading to the raise port 18 of the actuator arrangement 16 through a first valve 38 of the valve arrangement 34. A conduit 40 connects the conduit 28 leading to the lower port 20 of the actuator arrangement 16 through the first valve 38 to the reservoir 23.

The first valve 38 is spring biased to a first position at which fluid flow through the conduits 36,40 is blocked and movable to a second position at which fluid flow through the conduits 36,40 is open. The first valve 38 is movable to the second position in response to receipt of a ride control activation signal.

The accumulator arrangement 32 includes first, second and third accumulators 42,44,46 connected in parallel to the conduit 36. The first accumulator 42 has a predetermined fluid capacity and a predetermined pressure setting. The second accumulator 44 has a predetermined fluid capacity and a predetermined pressure setting that is larger than the pressure setting of the first accumulator 42. The third accumulator 46 has a predetermined pressure setting that is larger than the pressure setting of the second accumulator 44.

Each of the accumulators 42,44,46 could have the same fluid capacity but it is recognized that their respective fluid capacities could vary depending on system requirements. This means that the fluid capacity of each of the accumulators 42, 44,46 could be different form each other. Likewise, it is recognized that various numbers of accumulators could be used without departing from the essence of the subject invention. If four accumulators are used the pressure setting of the fourth accumulator would be larger than the third and the third accumulator would have a predetermined fluid capacity. The same relationship would be true if a fifth accumulator or more were added. Even though it is not illustrated in the drawings, it is envisioned that control valves could be disposed in the lines leading from the respective accumulators 42,44,46 and selectively controlled in order to provide a variable pressure rate for the accumulator arrangement 32 without departing from the essence of the subject invention.

A second valve 48 of the valve arrangement 34 is located between the raise port 18 and the accumulator arrangement 32. More specifically, the second valve 48 is disposed in a conduit 50 connected between the conduit 36 on one side of the first valve 38 and to the conduit 36 on the other side of the first valve 38. The second valve 48 is spring biased to a flow blocking position and movable to a flow communicating position in response to movement of the directional control valve 24 to the raise position. In the subject embodiment, a pressure switch 52 is connected to the hydraulic pilot signal line leading to the directional control valve 24 and when a pressure signal is in the pilot signal line, the pressure switch 52 senses the pressure and delivers an electrical signal to the second valve 48 moving it to its second, open position. The second valve 48 is operative to charge the accumulators 42,44,46 at the same time the load is being raised. Consequently, the pressure in the accumulator arrangement 32 is maintained substantially the same as the pressure at the raise port 18 of the actuator arrangement 16.

The valve arrangement 34 includes a third valve 54 movable from a first spring biased position towards a second position. The third valve 54 is operative to maintain the pressure level in the accumulator arrangement 34 substantially the same as the pressure in the raise port 18 of the actuator arrangement 16. The difference in the pressure at the raise port 18 and the pressure in the conduit 36 leading to the accumulator arrangement 32 is equal to the force of the spring bias. The first spring biased end of the third valve 54 is connected to the raise port 18 through conduits 56,36,26. The second end thereof is connected to the accumulator arrangement 32 through conduits 58,36. At the first spring biased position, communication between the accumulator arrangement 32 and the reservoir 23 is blocked. At the second position thereof, the communication between the accumulator arrangement 32 and the reservoir 23 is open.

Figure 2:
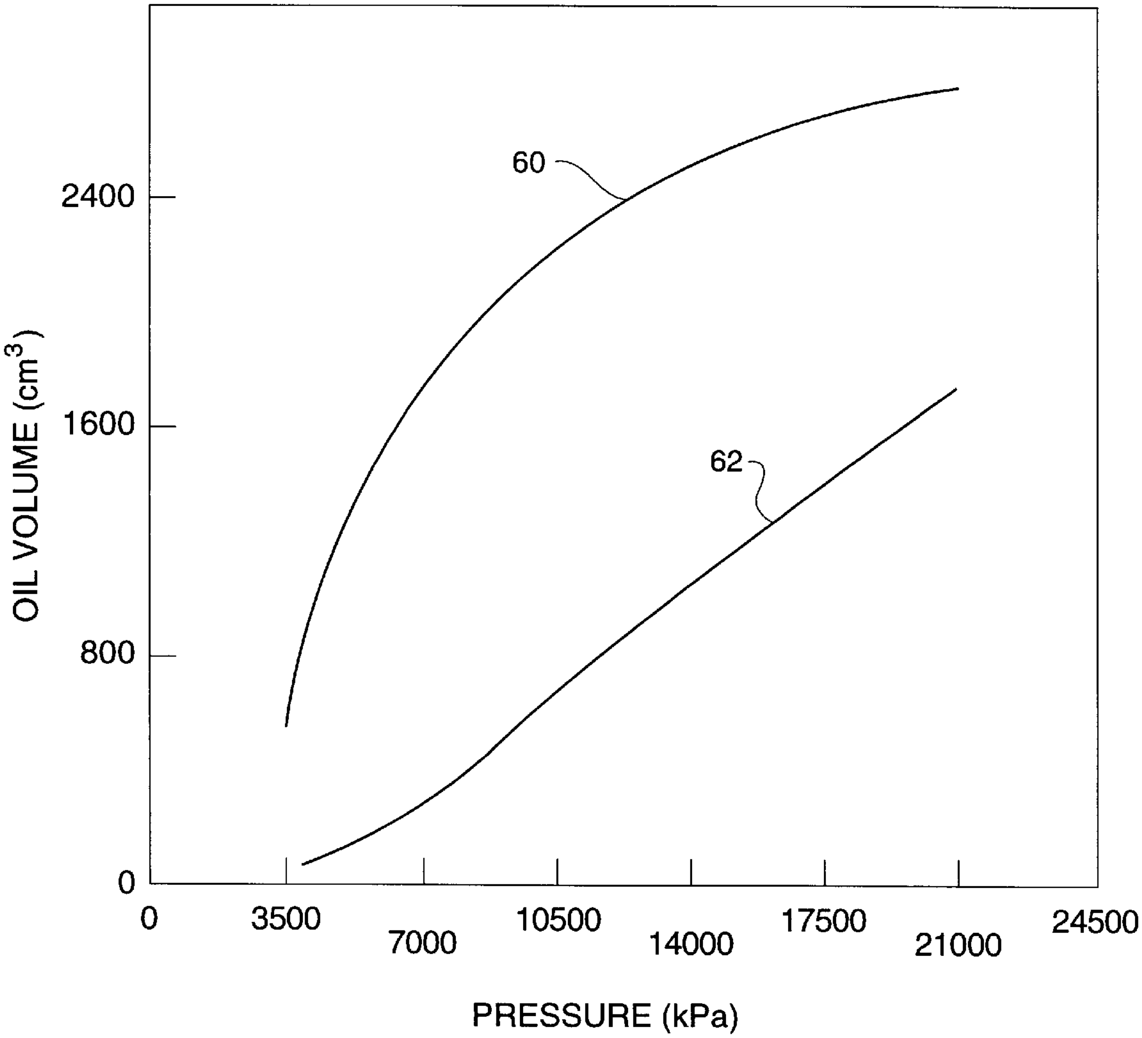
FIG. 2 is a graph illustrating the relationship between the ride control of a machine with the present invention and one without.

Referring to FIG. 2, a graph is illustrated. A curved line 60 generally illustrates the relationship between the pressure of the fluid in a typical known cushion ride system and the volume of fluid entering the accumulator of these previously known systems. A generally straight line 62 illustrates the relationship between the pressure of the fluid in the subject fluid system 10 and the volume of fluid entering the accumulator arrangement 32. As illustrated, the problem with the pressure/volume relationship of the line 60 is that it is a curved line. The curve starts out steep at low pressures and flattens out at high pressures. This means that for a given change in pressure in the system the oil volume taken into the accumulator is much greater at low pressure than at high pressure. This results in a large amount of actuator travel at low pressures and a small amount of actuator travel at high pressures. Consequently, with small loads, the ride control absorbs most of the shock due to bumps in the path being traversed by the machine. However, with larger loads, the shock is not very well absorbed since smaller amounts of fluid is being received by the accumulator.

As shown by the line 62, the volume of fluid being received by the accumulator arrangement 32 is substantially the same over a wide range of pressures. This means that for a given change in pressure in the system, the resulting actuator arrangement 16 movement at high pressure is substantially the same as the actuator arrangement movement at low pressure. Therefore, if the machine encounters a bump or some other reason for a change in the pressure to the actuator arrangement 16, the degree of cushioning is substantially the same whether the load 14 on the actuator arrangement (in the bucket) is large or small.

Industrial Applicability

The operation of the subject machine having the variable rate ride control system 30 included therein is hereinafter described.

With the first valve 38 in its first position, the accumulator arrangement 32 is blocked from the raise ports 18 of the actuator arrangement 16. In this mode of operation, the actuator arrangement 16 is "solid", that is, there is no cushioning to the fluid pressure in the conduits 26,28. If the directional control valve 24 is in its centered, flow blocking position, any changes in the condition of the load 14 results in the load (pressure) change or shock being transferred into the machine. This normally results in the machine bouncing or loping. Either result is uncomfortable to the operator and increases his fatigue.

During operation of the machine, if the pressure at the raise port 18 is lower by a given amount than the pressure in the conduit 36 leading to the accumulator arrangement 32, the third valve 54 functions to relieve the pressure in the accumulator arrangement 32. Once the pressure in the conduit 36 exceeds the pressure at the raise port 18 by an amount equal to a pressure equivalent to the spring biasing force on the third valve 54, the third valve moves towards its second position to relieve fluid from the accumulator arrangement 32 to the reservoir 23. Once the pressure at the raise port 18 plus the pressure representative of the spring biasing force equals the pressure in the conduit 36, the third valve 54 returns to its first flow blocking position.

Additionally, if the operator moves the directional control valve 24 to its raise position, the second valve 48 is moved to its second position which passes pressurized fluid from the conduit 26 through the conduits 36,50,36 to charge the accumulator arrangement 32 to substantially the same as the pressure at the raise port 18 of the actuator arrangement 16. Through the operation of the second and third valves 48,54, the pressure within the conduit 36 leading to the accumulator arrangement 32 is maintained at substantially the same pressure level as that at the raise port 18 of the actuator arrangement 16. Therefore, whenever the ride control is engaged, the load does not drop slightly nor does it move up slightly.

In order to engage cushion ride, the operator provides a signal to move the first valve 38 to its second position. At the second position of the first valve 38, the conduit 26 connected to the raise port 18 is in communication with the accumulator arrangement 32 through the conduit 36. At the same time, the conduit 28 connected to the lower port 20 is in communication with the reservoir 23 through the conduit 40. In this mode of operation, any changes in the condition of the load, such as occurs when the machine engages a bump, the shock or change in pressure is absorbed by the accumulator arrangement 32.

If the load is light, such as with an empty bucket, the shock is absorbed by the first accumulator 42 which has a lower pressure setting. If the shock is major, a portion of the shock will also be absorbed by the second accumulator 44. This is true since with a major shock, the pressure spike to the system is higher. Consequently, more fluid is being displaced from the actuator arrangement 16. Once the predetermined capacity within the first accumulator 42 is filled, the pressure in the conduit increases and the second accumulator 44 begins to receive the higher pressurized fluid.

If the load 14 is heavier, such as by filling the bucket, the first accumulator 42 would be filled due to the heavier load and any shock that the machine is subjected to is initially absorbed by the second accumulator 44. Once the predetermined capacity of the second accumulator 44 is filled, the third accumulator 46 begins to absorb the higher pressurized fluid. Consequently, as generally shown by the substantially straight line 62 of FIG. 2, changes in the load (pressure) does not change the cushioning ability of the variable rate ride control system 30.

As previously noted, more than three accumulators could be used in the variable rate ride control system 30 depending on the degree of cushioning desired. The degree of cushioning in the subject embodiment is generally based on the number of accumulators used, the capacity of each accumulator and the pressure setting of each accumulator.

From the foregoing, it is readily apparent that the subject variable rate ride control system 30 provides a cushion ride arrangement for a machine that is not substantially affected by a change in the load (filling of the bucket) on the machine. Regardless of the magnitude of the load, the subject system provides a generally uniform ride cushioning.

Other aspects, objects and advantages of the invention can be obtained from a study of the drawing, the disclosure and the appended claims.

What is claimed is:

1. A variable rate ride control system adapted for use in a fluid system of a machine to cushion the ride of the machine, the machine having a frame with an actuator arrangement disposed between the frame and a load to raise the load relative to the frame, the actuator arrangement having a raise port and a lower port and operative to raise and lower the load in response to pressurized fluid being selectively directed to and from the respective raise and lower ports thereof from a directional control valve that is connected to a source of pressurized fluid and a reservoir, the variable rate ride control system comprising:

an accumulator arrangement having first and second accumulators connected in parallel, the first accumulator having a predetermined fluid capacity and a predetermined pressure setting and the second accumulator having a predetermined fluid capacity and a larger predetermined pressure setting and the accumulator arrangement being selectively connected to the actuator arrangement at a location downstream of the directional control valve; and a valve arrangement disposed between the accumulator arrangement, the actuator arrangement, and the reservoir and operative to selectively connect the accumulator arrangement to the actuator arrangement and the reservoir, the valve arrangement includes a first valve selectively movable from a first spring biased position towards a second position and being connected between the accumulator arrangement and the actuator arrangement, at the first position of the first valve, the raise and lower ports are blocked from the accumulator arrangement and the reservoir and at the second position of the first valve, the accumulator arrangement is connected to the raise port and the lower port is connected with the reservoir.

2. The variable rate ride control system of claim 1 wherein the valve arrangement includes a second valve connected between the accumulator arrangement and the raise port of the actuator arrangement, the second valve is movable from a spring biased flow blocking position towards a flow communicating position in response to the directional control valve being moved to raise the load.

3. The variable rate ride control system of claim 1 wherein the valve arrangement includes a third valve having a first end connected to the raise port of the actuator arrangement and a second end connected to the accumulator arrangement, the third valve is disposed between the accumulator arrangement, the reservoir and the actuator and movable between first and second positions, at the first position flow between the accumulator arrangement and the reservoir is blocked and at the second position flow therebetween is open, the valve is movable to the first position in response to a spring bias on the first end in combination with the force from the pressure in the raise port and biased to the second position in response to the force of the pressure of the fluid in the accumulator arrangement.

* * * * *